United States Patent
Paul

(10) Patent No.: US 10,425,579 B2
(45) Date of Patent: Sep. 24, 2019

(54) SOCIAL CAMERA FOR AUTO GROUP SELFIES

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/857,371

(22) Filed: Dec. 28, 2017

(65) Prior Publication Data

US 2019/0208116 A1 Jul. 4, 2019

(51) Int. Cl.
*H04N 5/232* (2006.01)
*G06F 3/16* (2006.01)
*G06Q 50/00* (2012.01)

(52) U.S. Cl.
CPC ......... *H04N 5/23222* (2013.01); *G06F 3/167* (2013.01); *G06Q 50/01* (2013.01); *H04N 5/23216* (2013.01); *H04N 5/23219* (2013.01)

(58) Field of Classification Search
None
See application file for complete search history.

(56) References Cited

U.S. PATENT DOCUMENTS 9,253,434 B2 * 2/2016 Boss .................. H04N 5/23229

* cited by examiner

*Primary Examiner* — Mark T Monk
(74) *Attorney, Agent, or Firm* — Baker Botts L.L.P.

(57) ABSTRACT

In one embodiment, a method includes determining, by an application running on a client system of a first user, one of a plurality of cameras of the client system being used to capture an image. The plurality of cameras may include a front camera and a back camera of the client system. The application may detect one or more of the first user and one or more second users using the determined camera. The application may determine whether one or more image-capturing criteria are satisfied. If the one or more image-capturing criteria are satisfied, the application may capture the image using the determined camera. Otherwise, the application may provide feedback to one or more of the first user and the one or more second users to perform one or more actions in order to comply with the image-capturing criteria.

20 Claims, 14 Drawing Sheets

SOCIAL CAMERA FOR AUTO GROUP SELFIES

TECHNICAL FIELD

This disclosure generally relates to automatic capture of images (e.g., selfies) using a front or a back camera of a mobile device.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user. One user may also send images and videos to other users of the social-networking system, such as those who are directly or indirectly connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras (e.g., front camera, back camera), scanners, touch screens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a client application running on a client system (e.g., a mobile device) may identify a user intent for automatically capturing an image of the user. The image may be a selfie (e.g., a user capturing a picture of himself or herself being referred to herein as a "selfie"). The user intent may indicate what type of image the user is intending to capture or is interested in capturing. For example, the user intent may be to capture a selfie of the user using a front camera of the client system. The client application (e.g., a camera application) may identify the user intent for capturing the selfie based on one or more user-intent indicators. These user-intent indicators may include, for example, (1) the user selecting the front camera of the client system, (2) the client application detecting the face of the user, (3) an orientation range being associated with the client system while the user is trying to capture the selfie, and/or (4) the user holding the client system in a stable position as he is trying to capture the selfie. Once these user-intent indicators are determined or satisfied, the client application may automatically capture the selfie of the user without requiring them to click on the capture button or provide any input.

In particular embodiments, a client application running on a client system may automatically capture an image (e.g., a group selfie) using a back camera of the client system. The client application may do so by analyzing one or more image-capturing criteria, determining whether the one or more image-capturing criteria are satisfied, and capturing the image when the image-capturing criteria are determined to be satisfied. In one embodiment, there may be two specific image-capturing criteria that need to be satisfied. Satisfying a first image-capturing criterion may include the client application determining whether one or more users undergoing an image capture are within a camera frame defined by the back camera. Determining whether the one or more users are within the camera frame may include determining whether the one or more users are clearly visible in the image or if any user is getting cut out of the image. If a user is determined as being cut out of the image or as being partially present, the client application may provide an audio feedback targeted to that user instructing him to move in a certain direction to move within the camera frame. For example, if part of the user is determined to be falling outside the defined camera frame in the right direction then the camera application may provide audio feedback to the user such as "please move to your left" to instinct them to come within the camera frame and satisfy the first image-capturing criterion. The audio feedback that is provided by the client application may be personalized according to the user to which it is targeted. The client application may use social-networking information of the user to generate a personalized audio message for the user. In particular embodiments, satisfying a second image-capturing criterion may include the client application determining whether the client system with which a user is capturing the image is in a stable position or not. Once these two image-capturing criteria are satisfied, the client application may automatically capture the image (e.g., a group selfie) using the back camera of the client system.

In particular embodiments, a client application may capture an image in response to receiving a voice cue or command from a user. For instance, the user may give an indication to the client application to capture the image (e.g., a selfie or a group selfie) by giving voice cues such as "cheese," "smile," etc. Upon receiving a voice cue from the user, the client application may start a predefined timer, which when ends signals a camera (e.g., front or back) to take the image of one or more users.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

FIGS. 1A-1D illustrate examples of user-intent indicators that may be used to identify a user intent for automatically capturing an image (e.g., a selfie) without requiring a user input. For example, if the user intent is to capture a selfie, then some indicators may include (1) the user selecting the front camera of a client system (e.g., a mobile device), (2) an application running on the client system recognizing the face of the user, (3) an orientation range being associated with the client system while the user is trying to capture the selfie, and (4) the user holding the client system in a stable position as he is trying to capture the selfie. In this example, if these four scenarios are satisfied, then a client application (e.g., a camera application), running on the client system, may automatically capture the selfie of the user without having him to click on the capture button or provide any input.

Figure 1A:
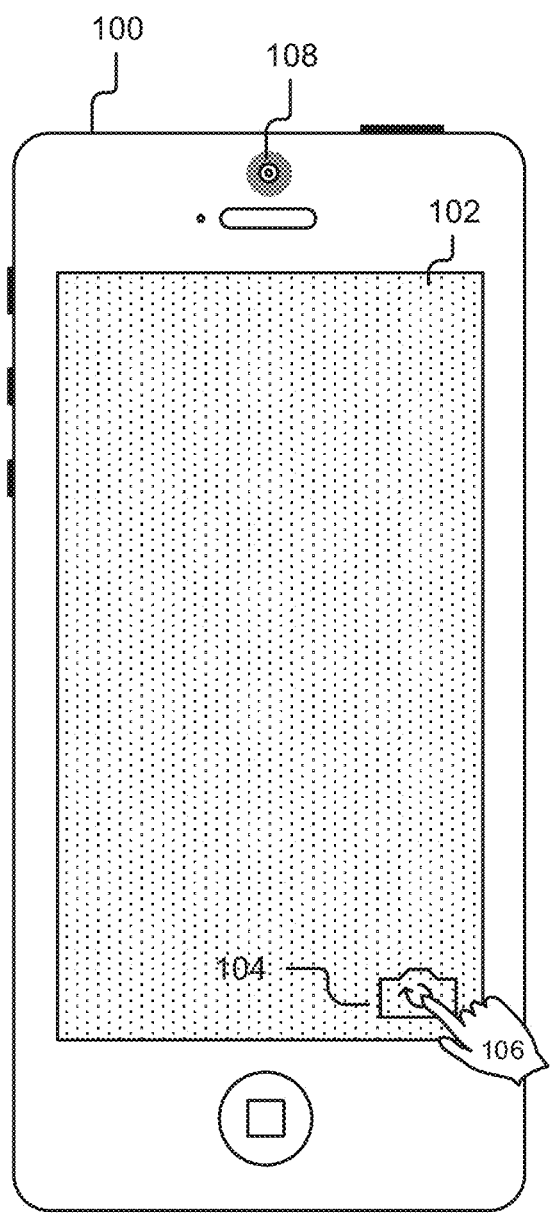
FIGS. 1A-1D illustrate examples of user-intent indicators that may be used to identify a user intent for automatically capturing an image (e.g., a selfie) without requiring a user input.

In particular embodiments, a client application 732 running on a client system 730, as described further below in reference to FIG. 7, may identify a user intent based on one or more user-intent indicators. The client application 732 may be a camera application for capturing images/videos of one or more users using cameras associated with the client system 730. For instance, the client application 732 may capture a selfie image/video of the one or more users using a front camera associated with the client system 730, and/or may capture a image/video of the one or more users using a back camera of the client system 730. The front camera may be located on the same side as the primary or main display of the client system 730 and faces the user while they are viewing the main display while the back camera may be located on a back side of the client system 730 opposite the main display. The client application 732 may provide a graphical user interface to a user with an option to select a desired camera with which the user wants to capture images/videos. For example, as shown in FIG. 1A, the client application 732 may present a graphical user interface 102 with a camera flip button 104 that the user can select (e.g., via a touch gesture 106) to activate a desired camera. In some embodiments, by default, the camera may be set to the back camera when the user opens client application 732. The user may select the camera flip button 104 to switch the camera from back to front in order to capture selfie(s).

When a user is intending to capture an image, the client application 732 (e.g., the camera application) may identify a user intent and based on the identification of the user intent, may capture the image without requiring user input. The client application 732 may identify the user intent based on a determination of one or more user-intent indicators. In particular embodiments, if the user intent is to take a selfie, then the client application 732 may identify this intent based on fulfillment of four user-intent indicators. Each of these four user-intent indicators is discussed below in reference to at least FIGS. 1A-1D.

FIGS. 1A-1D illustrate examples of user-intent indicators that may be used to identify a user intent in reference to capturing a selfie. In particular, FIG. 1A illustrates an example of a first user-intent indicator that may be used by the client application 732 to identify a user intent. FIG. 1A shows a graphical user interface 102 that may be displayed on a mobile device 100. The graphical user interface 102 may be rendered by the client application 732 (e.g., the camera application) discussed herein. As shown, the graphical user interface 102 may present a camera flip button 104, which when interacted by the user (as indicated by reference numeral 106) activates either the front camera 108 or the back camera (not shown) of the mobile device 100. In the depicted embodiment, the user clicks on the camera flip button 104 to activate the front camera 108 of the mobile device 100. The front camera 108 selection by the user may be recorded by the client application 732 as an indication that the user is interested in taking a selfie.

Figure 1B:
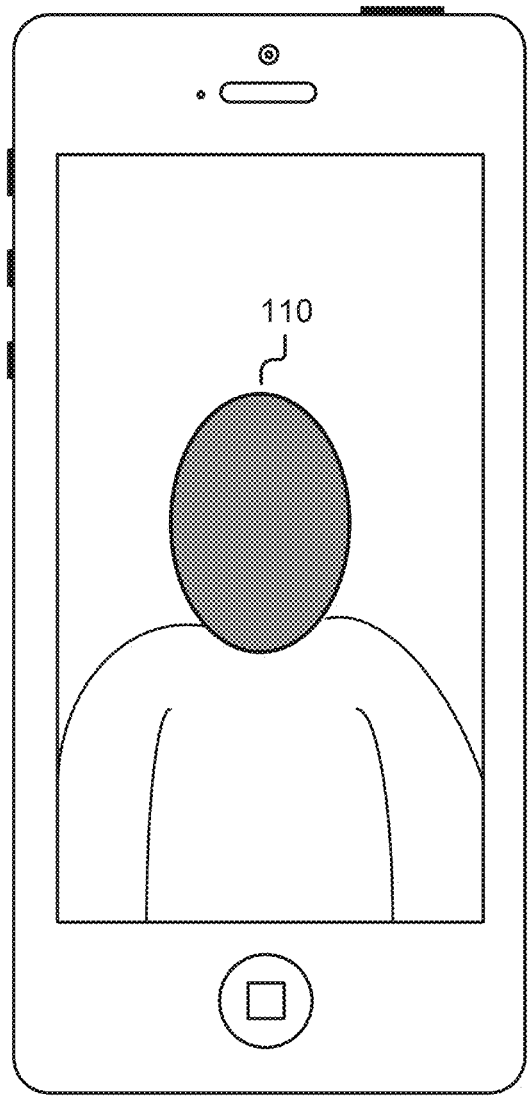

FIG. 1B illustrates an example of a second user-intent indicator that may be used by the client application 732 to identify user intent for capturing a selfie. In this figure, the client application 732 may detect the face 110 of the user and use the face detection as an indication that the user is interested in capturing a selfie. When a user is taking a selfie, usually the user's face is the most focused part in the picture. This is because of the limited field of view when the user is holding mobile device 100 to take a selfie using a front camera of the device. Since a face is the most focused part in a selfie, when the client application 732 detects that a face is covering a significant portion of the area within a camera frame, the client application 732 may use this as an indication that the user intent is to capture a selfie. In some embodiments, the client application 732 may perform face detection using a standard face detection technique or algorithm known in the art.

Figure 1C:
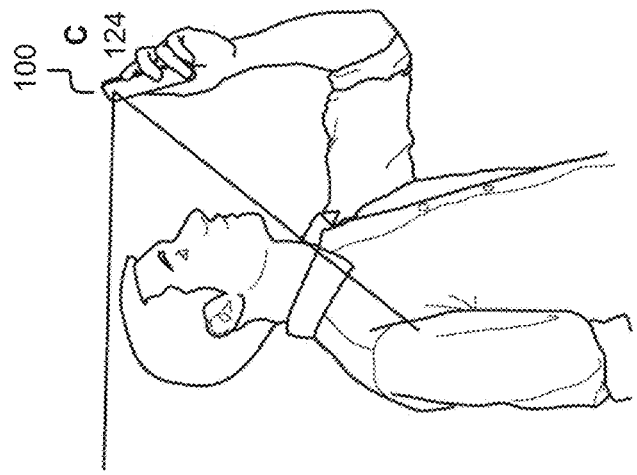
Figure 1C:
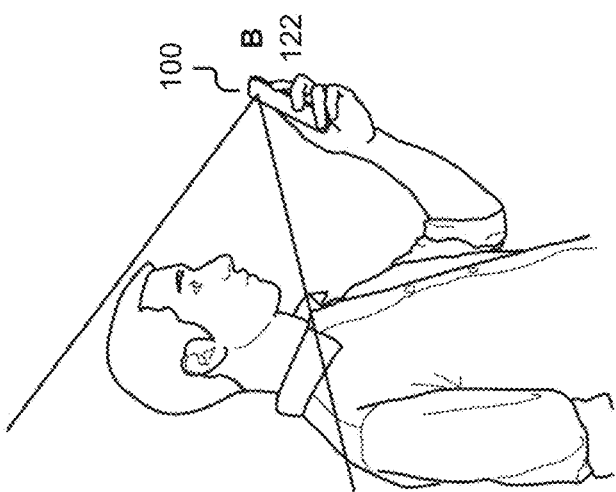
Figure 1C:
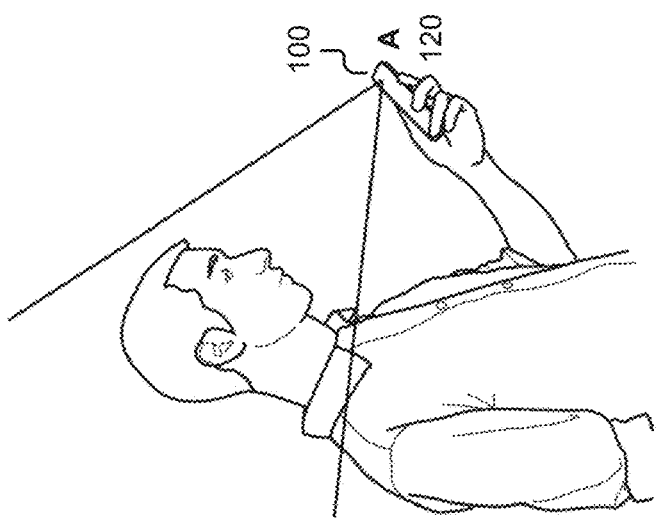

FIG. 1C illustrates a third user-intent indicator that may be used by the client application 732 to identify user intent for capturing a selfie. In this figure, the client application 732 may determine an orientation range 120-124 associated with the mobile device 100 while the user is holding the device for taking a selfie. For example, the client application 732 may detect that the mobile device 100 has moved from a position A (indicated by reference numeral 120) to a position B (indicated by reference numeral 122) and from the position B to a position C (indicated by reference numeral 124). This change in orientation of the device 100 may be due to the user trying to find the best location with optimum settings (e.g., appropriate lighting, no shadows, clear visibility, etc.) for taking the selfie. The client application 732 may track this change in orientation (or orientation range) (e.g., from 120 to 122 to 124) and use this as an indication that the user is intending to capture a selfie. In some embodiments, the client application 732 may track this change in orientation of the device 100 using one or more motion sensors (e.g., accelerometers, gyro sensors, etc.) present in the mobile device 100.

Figure 1D:
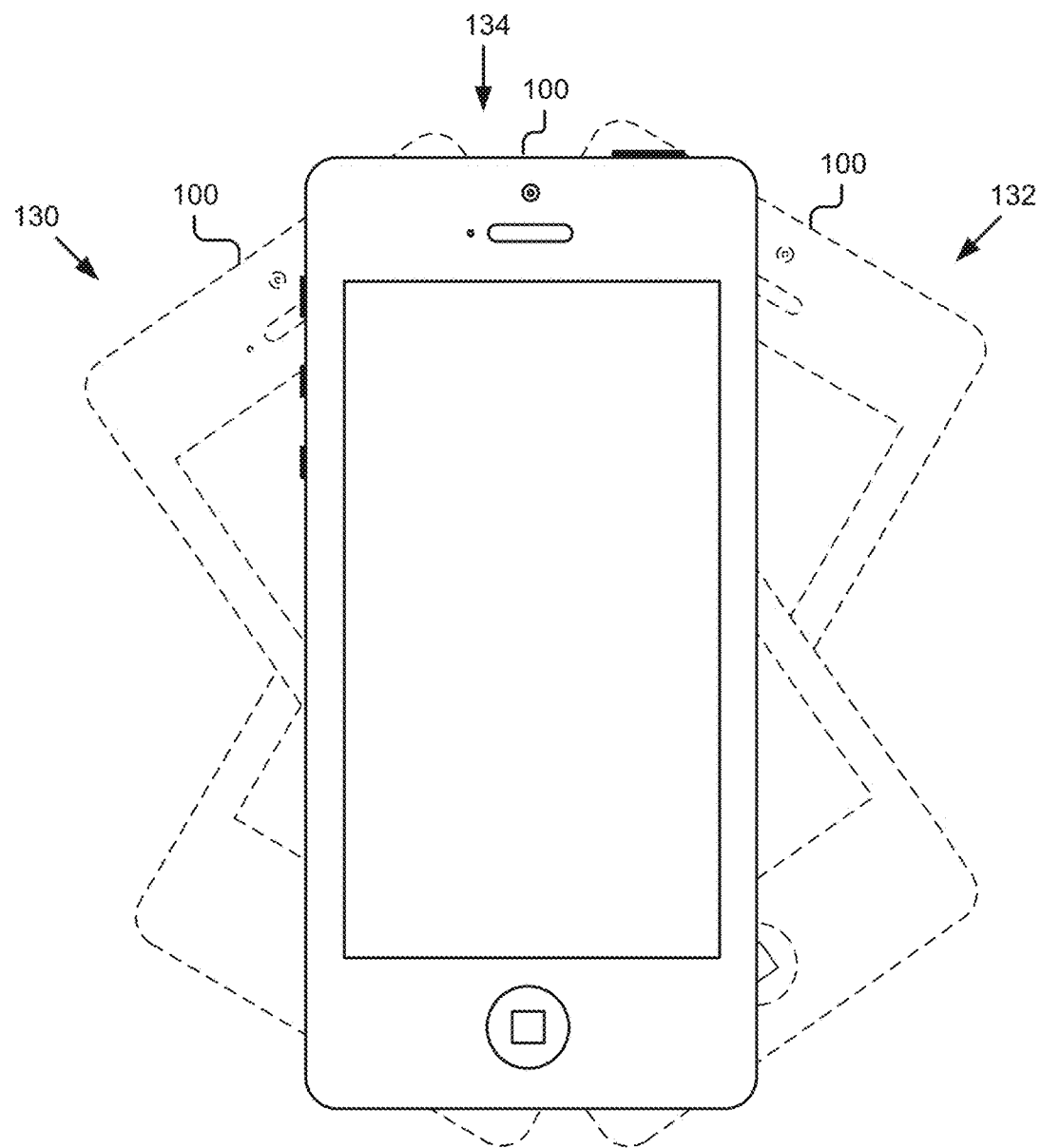

FIG. 1D illustrates an example of a fourth user-indicator that may be used by the client application 732 to identify user intent for capturing a selfie. In this figure, the client application 732 may determine whether the mobile device 100 is in a stable position. For instance, when the user is capturing an image, he may move mobile device 100 to several positions/locations (e.g., positions 130 and 132) before coming to a stable position 134 where they are ready to capture the image. This may be used by the client application 732 as an indication that the user is ready to take a selfie. In some embodiments, the client application 732 may sense the stability of the mobile device 100 or determine whether the mobile device 100 is in the stable position 134 using one or more motion sensors of the mobile device 100.

Figure 2:
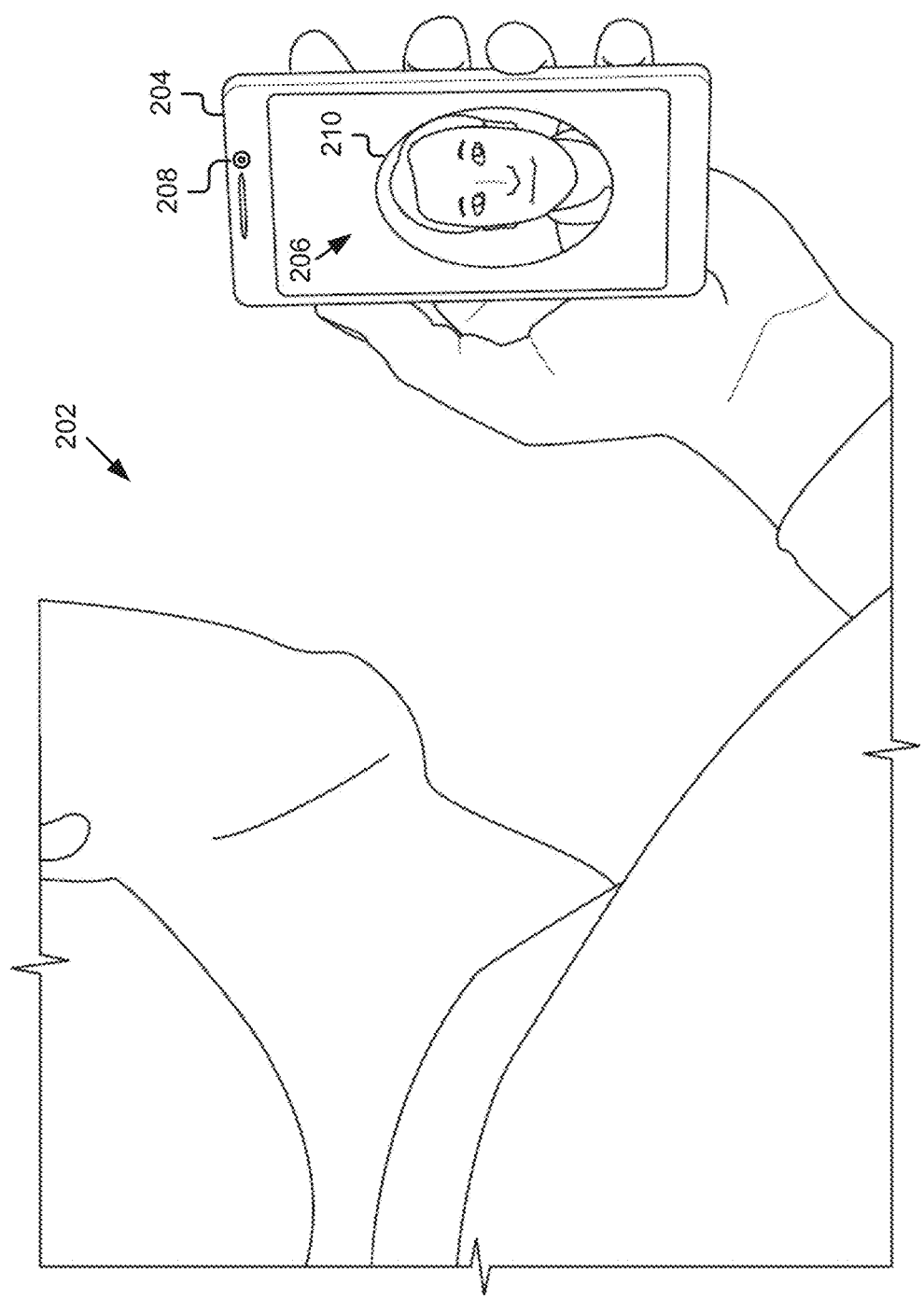
FIG. 2 shows an example illustration of an image (e.g., a selfie) automatically being captured upon identification of a user intent based on a plurality of user-intent indicators.

To further illustrate and describe the above discussed user-intent indicators, FIG. 2 shows an example illustration where a user 202 is holding a mobile phone 204 in their hand to capture a selfie 206. The display in the mobile phone 204 may be generated upon the user 202 selecting the front camera 208 using the camera flip button 104 (discussed in FIG. 1A). A camera application (e.g., the client application 732) running on the mobile phone 204 may detect the face 210 of the user using any appropriate face detection technique. The camera application may then determine if there is an orientation range that is associated with the mobile phone 204 while the user 202 is trying to capture the selfie 206. For example, the user 202 may move the mobile phone 204 from left to right (not shown) and settle at a point/location where they are satisfied with the image appearing on the phone's screen (e.g., the image appears bright with a desired background). The camera application may then determine whether the user is holding the mobile phone 204 in a stable position. As can be seen from FIG. 2, the user is holding the mobile phone 204 in a stable position. Once the camera application confirms the stability of the mobile phone 204, the camera application may automatically capture the selfie 206 of the user 202 as discussed elsewhere herein.

In particular embodiments, once some or all of the above discussed user-intent indicators are determined, the client application 732 may confirm that the user intent is to capture a selfie using a front camera of the client system 730 (e.g., the mobile device) and may proceed with automatically capturing the selfie for the user. In some embodiments, the above discussed user-intent indicators may be determined in a particular order for the user intent identification. For instance, the client application 732 may first determine whether the user has selected the front or the back camera to capture an image (as discussed in reference to FIG. 1A). If the user has selected the front camera, the client application 732 may then try to detect if there are one or more faces associated with the image that the user is trying to capture (as discussed in reference to FIG. 1B). Responsive to detecting the one or more faces, the client application 732 may determine whether there is an orientation range that is associated with the client system 730 (as discussed in reference to FIG. 1C). If an orientation range is determined, the client application 732 may then proceed to the last step to determine whether the client system 730 is in a stable position (as discussed in reference to FIG. 1D). Once the result of the determination in the last step is determined to be true, the client application 732 may determine that the user intent is to capture a selfie and automatically proceed to capture the selfie for the user without them having to select buttons or interact with the client system 730.

It should be noted that identifying a user intent to capture a selfie is not limited to the four user-intent indicators discussed herein. Additional or fewer user-intent indicators may be used by other embodiments to determine a user's intent to capture selfies. For example, identifying the user intent may only include determining the first and last user-intent indicators as discussed in reference to FIGS. 1A and 1D, respectively. As another example, identifying the user intent may include determining the first, second, and last user-intent indicators as discussed in reference to FIGS. 1A, 1B, and 1D, respectively. Other variations or combinations for the user intent identification are also possible and within the scope of the present disclosure.

In particular embodiments, once the client application 732 identifies a user intent, the client application 732 may provide an audible chime or message to the user whose selfie is about to be taken. The audible chime or message may be provided via a speaker of a client system 730 with which the client application 732 is associated. The audible chime or message may be used to signal or alert the user to prepare for the selfie. Providing an audible chime or message is advantageous as the user may be alerted to when their picture is about to be taken. In some embodiments, responsive to providing the audible chime or message, the client application 732 may start a predefined count-down or count-up timer, which when reaches to its minimum (e.g., zero) or maximum (e.g., three) value signals the front camera of the client system 730 to capture the picture. As an example and not by way of limitation, the client application 732, upon identifying a user intent as capturing a selfie, may first provide an audible chime to the user for them to prepare and then start a three second count-down timer. Once the three second count-down timer reaches zero, the client application 732 may automatically capture the selfie of the user without the user having to click or touch any buttons.

In some embodiments, the client application 732, after providing the audible chime or message, may be configured to wait to capture the selfie until it receives a voice command from the user. During this wait or hold time, the user may, for example, work on their face expressions. Once they are ready for the selfie, the user may give an indication to the client application 732 to capture the selfie by giving voice cues such as "cheese," "smile," etc. (as shown for example in FIG. 5A). Upon receiving the voice cue from the user, the client application 732 may start a predefined timer, which when ends signals the front camera to automatically take the selfie of the user. In some embodiments, upon receiving the voice cue from the user, the client application 732 may proceed to immediately capture the selfie without initiating the timer.

In certain embodiments, the client application 732 may be further capable of analyzing scene or background conditions when taking a picture (e.g., a selfie) and providing feedback to a user upon determining that one or more scene conditions do not meet a predefined threshold. For example, the client application 732 may determine whether there is appropriate lighting (e.g., a threshold degree of lighting) for user's image to be clearly visible or if there are any shadows around the user (e.g., less than a maximum amount of shadows) before taking a selfie of the user. If the client application 732 determines one or more scene conditions do not satisfy one or more criteria (e.g., not enough light, presence of shadows, etc.) then the client application 732 may provide feedback to the user so that the user may improve the scene or background conditions for the image to be captured. The feedback may be visual or audio feedback. For example, if the background is too dark or overall light is low, then the client application 732 may present a message on the display screen of the client system 730 stating "light is too low, please turn on more lights or move to a brighter area." The same message may also be provided in the form of an audio message by the client application 732. Other means of providing this feedback to the user are also possible and within the scope of the present disclosure.

In particular embodiments, when the client application 732 has completed capturing a selfie of a user, the client application 732 may display a preview of the captured image along with some options of whether the user wants to post the captured image on his social network (e.g., Facebook) or retake the selfie. If the user input is to post the image on his social network, then the client application 732 may post the captured image in a newsfeed of the online social network so that other users (e.g., friends) on the social network may be able to see the image and enter any comments about the image. In some instances, the client application 732 is a camera application associated with the online social network. Prior to the client application 732 posting the image, the user may be able to set privacy or sharing settings on the image. For instance, the user may choose whether he wants the captured image to be accessible to everyone (e.g., public), to friends, with a specific group, or just to himself in his personal timeline. In case the user does not like the captured selfie, the user can choose to retake it. In this scenario, the client application 732 may already know that the user intent is to capture the selfie so the client application 732 may skip the first three steps or determination of the first three user-intent indicators (as discussed above in reference to at least FIGS. 1A-1C). Once the client application determines the user's device (e.g., mobile device) is stable (as discussed above in reference to FIG. 1D), the client application 732 may retake the selfie of the user and again present a preview of the captured selfie along with the options discussed herein.

Figure 3:
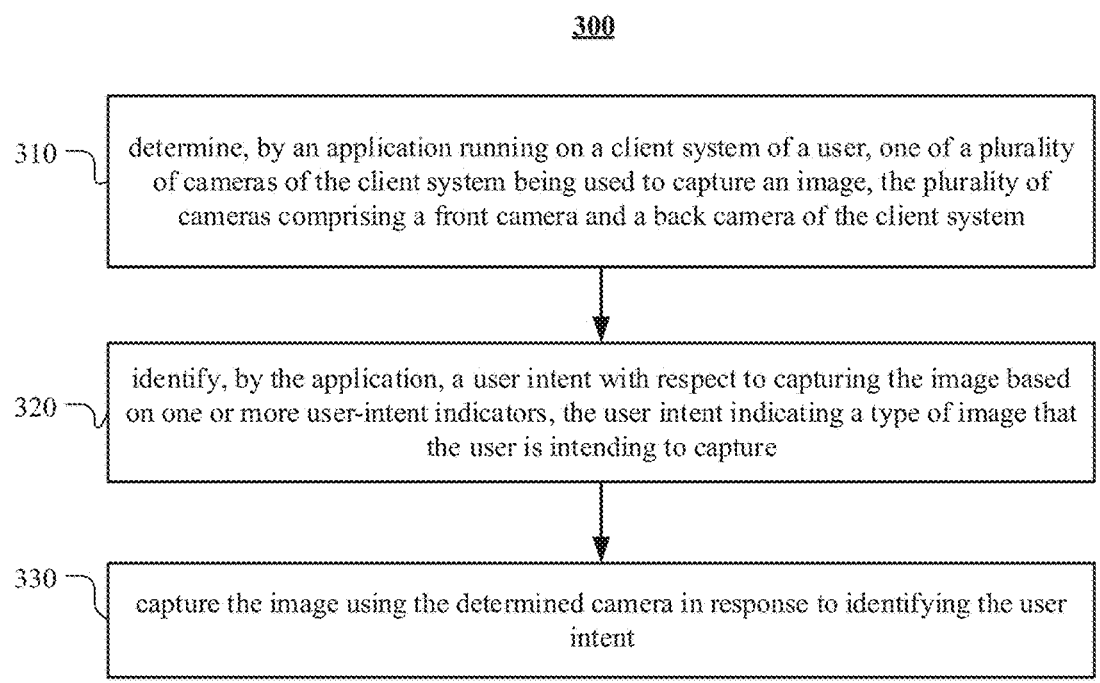
FIG. 3 illustrates an example method for identifying a user intent with respect to capturing an image (e.g., a selfie) and automatically capturing the image based on the identification of the user intent.

FIG. 3 illustrates an example method 300 for identifying a user intent with respect to capturing an image (e.g., a selfie) and automatically capturing the image based on the identification of the user intent. The method may begin at step 310, where an application (e.g., client application 732), running on a client system 730 of a user, may determine one of a plurality of cameras of the client system 730 being used to capture an image. The plurality of cameras may comprise a front camera and a back camera of the client system 730. In particular embodiments, the application may be a camera application associated with an online social network. At step 320, the application may identify a user intent with respect to capturing the image based on one or more user-intent indicators. The user intent may indicate a type of image that the user is intending to capture or interested in capturing. For example, the user intent may be to capture a selfie using the front camera of the client system 730. In particular embodiments, the user-intent indicators may include, as an example and not by way of limitation, (1) selection of the front camera by the user, (2) detection of the user's face within a camera frame, (3) an orientation range being associated with the client system 730, and/or (4) a stable position of the client system 730. At step 330, the application may capture the image using the determined camera in response to identifying the user intent. For instance, the client application 732 may capture a selfie of the user using the front camera upon identifying the user intent. In particular embodiments, prior to capturing the selfie, the application may provide an audible chime to the user when the user intent is determined. The audible chime may alert or signal the user to get ready as his selfie is about to be taken.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for identifying a user intent with respect to capturing an image and automatically capturing the image based on the identification of the user intent including the particular steps of the method of FIG. 3, this disclosure contemplates any suitable method for identifying a user intent with respect to capturing an image and automatically capturing the image based on the identification of the user intent including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4A:
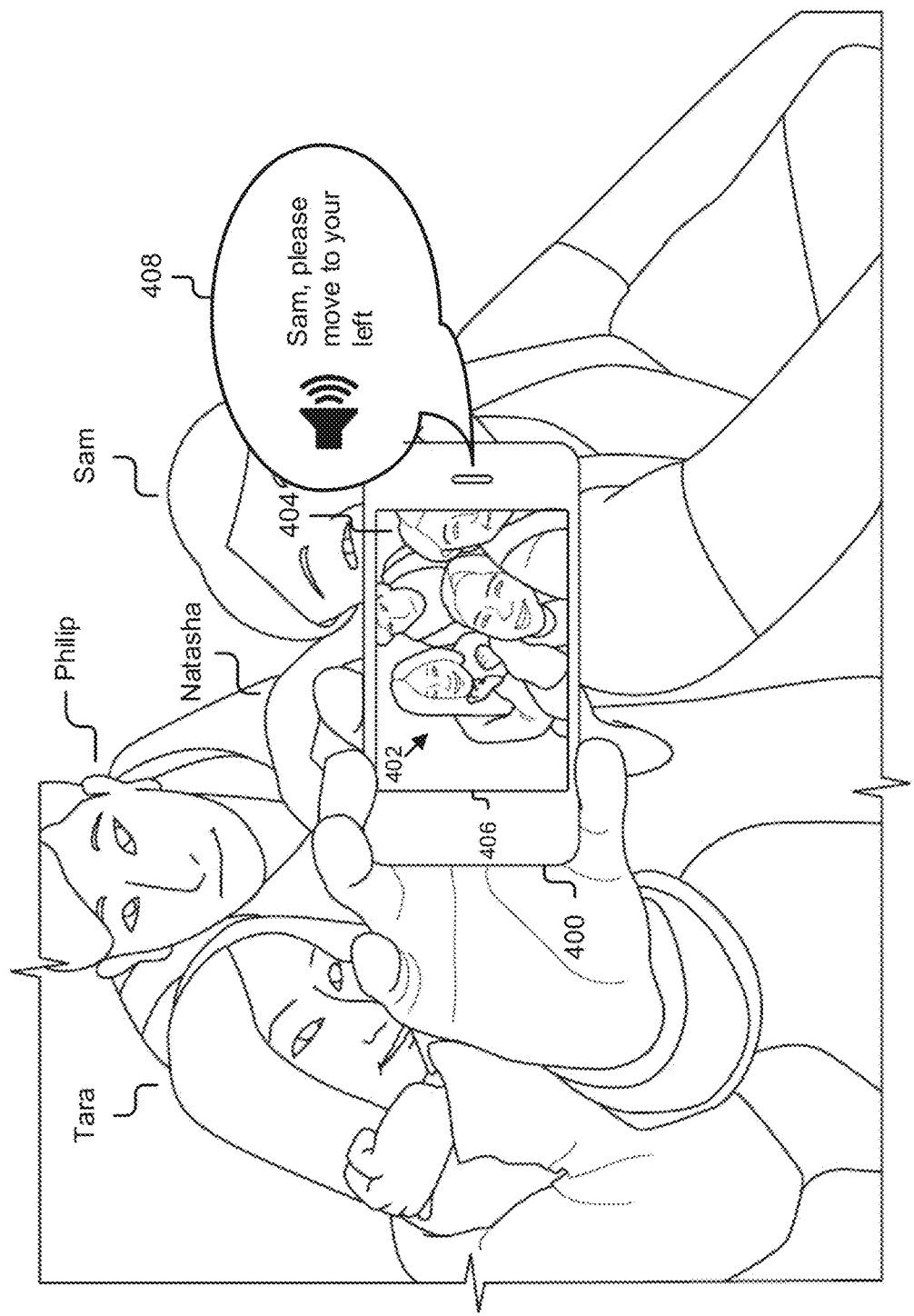
FIGS. 4A and 4B illustrate two exemplary image-capturing criteria that need to be satisfied for automatic capturing of a group selfie using a back camera of a mobile device.
Figure 4B:
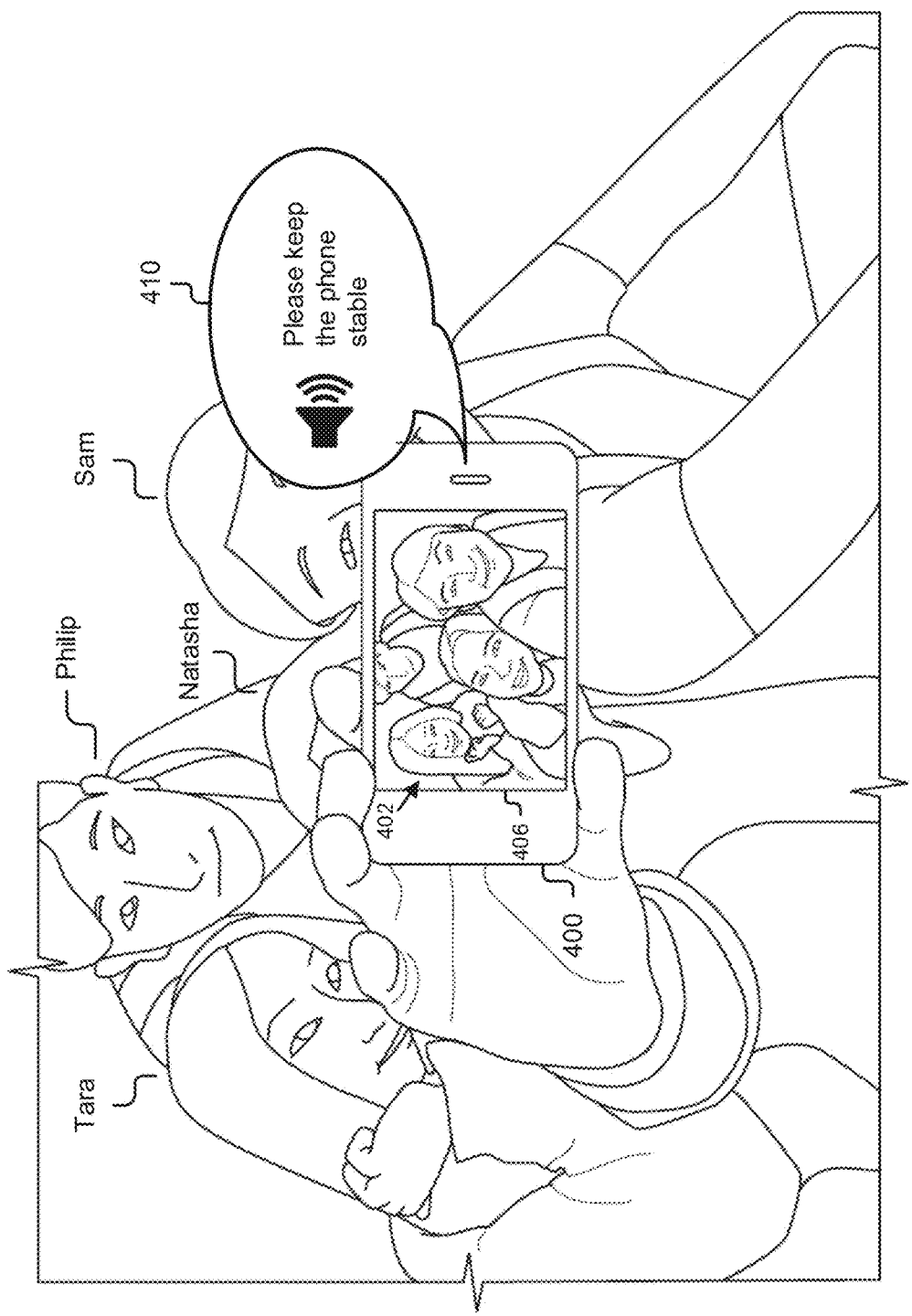
Figure 4C:
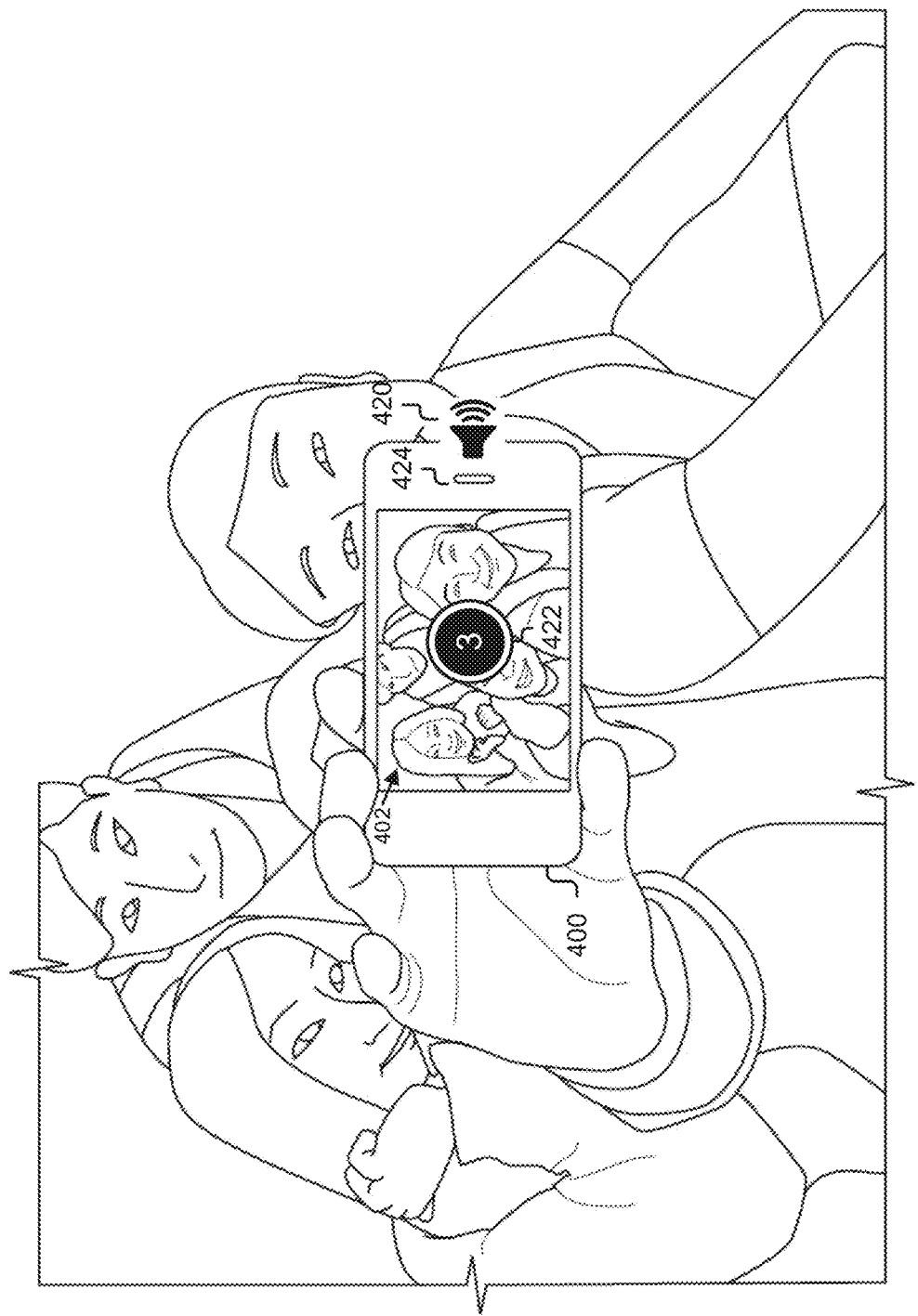
FIG. 4C illustrates automatic capturing of the group selfie in response to the two image-capturing criteria (discussed in FIGS. 4A and 4B) being satisfied.

FIGS. 4A-4C illustrate example embodiments of capturing of an image of a group of users (or, a "group selfie") using a back camera of a mobile device. When a user is using the back camera of a mobile device to capture a picture, the user typically does not know if they are within a camera frame (e.g., whether the user's face or body parts are within the camera frame). Since the main display of a mobile device is typically on the front side of the mobile device. Often times, this results in the user having to take several pictures to get a desired picture. Typically, there is no feedback that is provided to the user to remedy this process. Also, users typically have to manually click on a capture button to take a snapshot or picture. Particular embodiments of the present invention overcome these and other limitations of existing systems. For instance, a client application 732 (e.g., a camera application) may analyze one or more image-capturing criteria for capturing a group selfie and determine whether the criteria are satisfied. If the one or more image-capturing criteria are satisfied, the client application 732 may then automatically capture the image of one or more users using the back camera of a client system 730 (e.g., a mobile device). Otherwise, the client application 732 may provide feedback (e.g., audio feedback) indicating an action to be performed by the one or more users in order to comply with the image-capturing criteria. By way of an example, a user may be trying to capture a group selfie with one or more friends using the back camera of his mobile device. One of the criteria for automatic capturing of the group selfie by the client application 732 may be that all the users should be within a camera frame. One of the friends (e.g., "Sam") may be out of the camera frame (as shown in FIG. 4A). In this case, the client application 732 may play an audio message via a speaker of the client system 730 saying "Sam, please move to your left" (see FIG. 4A) in order for all the users to be within the camera for successfully capturing the group selfie.

Particular embodiments of the present invention also solve timer problems associated with taking group pictures. When taking a group picture, a user usually sets a timer which when ends automatically captures the picture. Sometimes one or more users may not be ready for the picture when the timer ends and the picture is taken. Also, the user who sets the timer may not have enough time to get back to the group and be ready for the picture. All these circumstances may result in an undesired group picture and require manually setting the timer again for another picture. Particular embodiments of the present invention address these and other problems with group pictures by allowing a user to give a voice cue or command that signals the camera that a group picture may be taken. Upon receiving the voice cue, the camera application 732 may capture the picture.

In particular embodiments, a client application 732 (e.g., a camera application) running on a client system 730 (e.g., a mobile device) may automatically capture an image using a back camera of the client system 730. The client application 732 may do so by analyzing one or more image-capturing criteria, determining whether the one or more image-capturing criteria are satisfied, and capturing the image when the image-capturing criteria are determined to be satisfied. In one embodiment, there may be two specific image-capturing criteria that need to be satisfied. Although this is not limiting and satisfying more than two criteria or maybe even one may also be possible and within the scope of the present disclosure.

In particular embodiments, satisfying a first image-capturing criterion may include the client application 732 determining whether one or more users are within a camera frame defined by the back camera. For example, there may be three users taking a group selfie using the back camera and the client application 732 may determine whether these three users fall within a camera frame of certain dimensions (e.g., 5 (height)×2 (width) dimensions). In some embodiments, determining whether the user(s) are within the camera frame may include determining whether the user(s) are clearly visible in the picture or if any user is at least partially cut out of the picture. If a user is determined as being cut out of the picture or as being partially present, the client application 732 may provide audio feedback targeted to that user instructing him to move in a certain direction in order to move within the camera frame. For example, if part of a user is determined to be falling outside the defined camera frame in the right direction, the camera application may provide an audio feedback to the user saying "please move to your left" to instruct them to come within the camera frame and satisfy the first image-capturing criterion.

In some embodiments, the audio feedback that is provided by the client application 732 may be personalized according to the user to which it is targeted. For example, in reference to FIG. 4A, since "Sam" is determined to be falling partially out of the camera frame, the audio message may be personalized to say "Sam, please move to your left." In particular embodiments, the client application 732 may be a camera application that is associated with an online social network (e.g., Facebook) and the one or more users in the group picture or selfie may be users of the social network. The client application 732 may send personalized messages to a user by using his social-networking information. The client application 732 may receive authority to access social-networking information of users by providing a notification to the users the first time they visit the client application or when the client application 732 detects the users. The notification may indicate that in order to provide personalized messages, the client application 732 may use social profiles of the users and request the authority to do so. Upon receiving access privileges from the users, the client application 732 may use social-networking information of the users to send personalized messages as discussed herein. In some embodiments, the client application 732 may send a personalized message to a target user by first performing a face detection on the user. Having detected the face of the user, the client application 732 may try to match the face with social profiles stored in the social network database. For instance, the client application 732 may match the detected face with profile pictures of various users stored in the social network database. Once a match is found, the client application 732 may use the social-networking information (e.g., first name, last name, age, friends, photos, etc.) of the matched contact to generate a personalized message for the target user.

In particular embodiments, satisfying a second image-capturing criterion may include the client application 732 determining whether the client system 730 (e.g., the mobile device) with which a user is capturing a group selfie is in a stable position. For instance, when a user is capturing a group selfie using the back camera, they may move their device to several positions/locations before arriving at a stable position. The client application 732, in cooperation with one or more motion sensors (e.g., gyro sensors, accelerometers, etc.) of the client system 730, may make a stability determination of the client system 730 (as discussed above in reference to at least FIG. 1D). Once the client system 730 is determined to be stable, its stability may be used by the client application 732 as an indication that the users are ready to be captured in the group selfie. In particular embodiments, the determination of the second image-capturing criteria (i.e., whether the client system is stable or not) is performed after determination of the first image-capturing criteria (i.e., users being within the camera frame) as being satisfied.

In particular embodiments, once the client application 732 identifies the above discussed image-capturing criteria as being satisfied, the client application 732 may provide an audible chime or message (as shown in FIG. 4C). The audible chime or message may be provided via a speaker of a client system 730 with which the client application 732 is associated. The audible chime or message may be used to signal or alert users to prepare for the group picture or selfie. Providing an audible chime or message is advantageous as the users may be alerted to when their picture is about to be taken. In some embodiments, responsive to providing the audible chime or message, the client application 732 may start a predefined count-down or count-up timer (e.g., see FIG. 4C), which when reaches to its minimum (e.g., zero) or maximum (e.g., three) value signals the back camera of the client system 730 to capture the picture. By way of an example, the client application 732, upon determining the one or more image-capturing criteria as being satisfied, may first provide an audible chime and then start a three second count-down timer. Once the three second count-down timer reaches zero, the client application 732 may automatically capture the group picture of the users.

FIG. 4A illustrates an example of a first image-capturing criterion for automatic capturing of a group selfie 402 using a back camera and an example audio feedback 408 in response to the first image-capturing criterion being not satisfied. As depicted, four friends "Tara," "Natasha," "Philip," and "Sam" are trying to capture a group selfie 402 using a back camera of a mobile device 400. Natasha is holding the mobile device 400 in her hand. A camera application (e.g., the client application 732) running on the mobile device 400 may detect that "Sam" is not fully present (as indicated by reference numeral 404) within the camera frame 406. In response to this detection, the camera application may play an audio message 408 specifically targeted to Sam such as "Sam, please move to your left." Once Sam follows the instructions given in the audio message 408, the camera application may determine all four friends to be located within the camera frame 406 (e.g., see FIG. 4B) and move to the determination of a second image-capturing criterion as discussed below in reference to FIG. 4B.

FIG. 4B illustrates an example of a second image-capturing criterion for automatic capturing of the group selfie 402 using the back camera and an example audio feedback 410 in response to the second image-capturing criterion being not satisfied. In particular embodiments, the determination of whether the second image-capturing criterion is satisfied or not is performed after the first image-capturing criterion is determined to be satisfied (as discussed above in reference to at least FIG. 4A). As mentioned in FIG. 4A, Natasha is holding the mobile device 400 in her hand. At some times, her hand may be shaky thereby causing mobile device 400 to not be stable. In order for the second image-criterion to be satisfied and the group selfie 402 to be automatically captured, mobile device 400 needs to be in a stable position. In the embodiment depicted in FIG. 4B, the camera application (e.g., the client application 732) may determine mobile device 400 to be unstable. Responsive to determining an unstable state of mobile device 400, the camera application may play an audio message 410 such as "Please keep the phone stable." Once Natasha follows the instructions given in the audio message 410, the camera application may determine the mobile device 400 as being stable (i.e., the second image-capturing criterion to be satisfied) and move to the final step of providing an audible chime or message and starting a timer for image capture as discussed below in reference to FIG. 4C.

FIG. 4C illustrates an example of an audible chime 420 and start of a predefined timer 422 in response to determining the first and second image-capturing criteria to be satisfied, as discussed above in reference to FIGS. 4A and 4B. The audible chime 420 may be played via a speaker of the device 400. For example, the chime 420 may be played via speaker 424. As soon as chime 420 is played, a three second count-down timer 422 may be initiated that when ends (e.g., reaches zero) signals the back camera of the device 400 to capture the group selfie 402 of the four friends.

As mentioned earlier, the client application 732 may not be limited to the two image-capturing criteria as discussed above and one or more additional image-capturing criteria may need to be satisfied before an image can be automatically captured by the client application 732. For example, an additional image-capturing criterion may be determining whether the scene or background in which an image is being taken satisfies one or more conditions. For example, the client application 732 may determine whether the background or scene around the one or more users contains sufficient light or a threshold degree of lighting so that all the users are clearly visible in the image. As another example, the client application 732 may determine whether there are any shadows occurring in the image being taken (e.g., less than a maximum amount of shadows). If the client application 732 determines the scene/background as not meeting the one or more conditions, the client application 732 may then provide an audio feedback as discussed elsewhere herein. As an example and not by way of limitation, if the client application 732 determines the background lighting to be too low and/or the people in the picture appearing dark, then the client application 732 may provide an audio message such as "please increase the lighting or move to a brighter region."

Once the appropriate image-capturing criteria are satisfied, the client application 732 may provide an audible chime or message to alert the one or more users to prepare for the image capture. In some embodiments, the client application 732, after providing the audible chime or message, may be configured to wait to capture the image until it receives a voice command from a user. For instance, upon hearing the audible chime, the one or more users, for example, may work on their face expressions or body poses. Once they are ready for the image capture, the one or more users may give an indication to the client application 732 to capture the image (e.g., group selfie) by giving voice cues such as "cheese," "smile," etc. (as shown for example in FIG. 5A). Upon receiving a voice cue from a user, the client application 732 may start a predefined timer, which when ends signals the back camera to automatically take the image of the one or more users. In some embodiments, upon receiving the voice cue from the user, the client application 732 may proceed to immediately capture the image of the one or more users without initiating the timer.

Figure 5A:
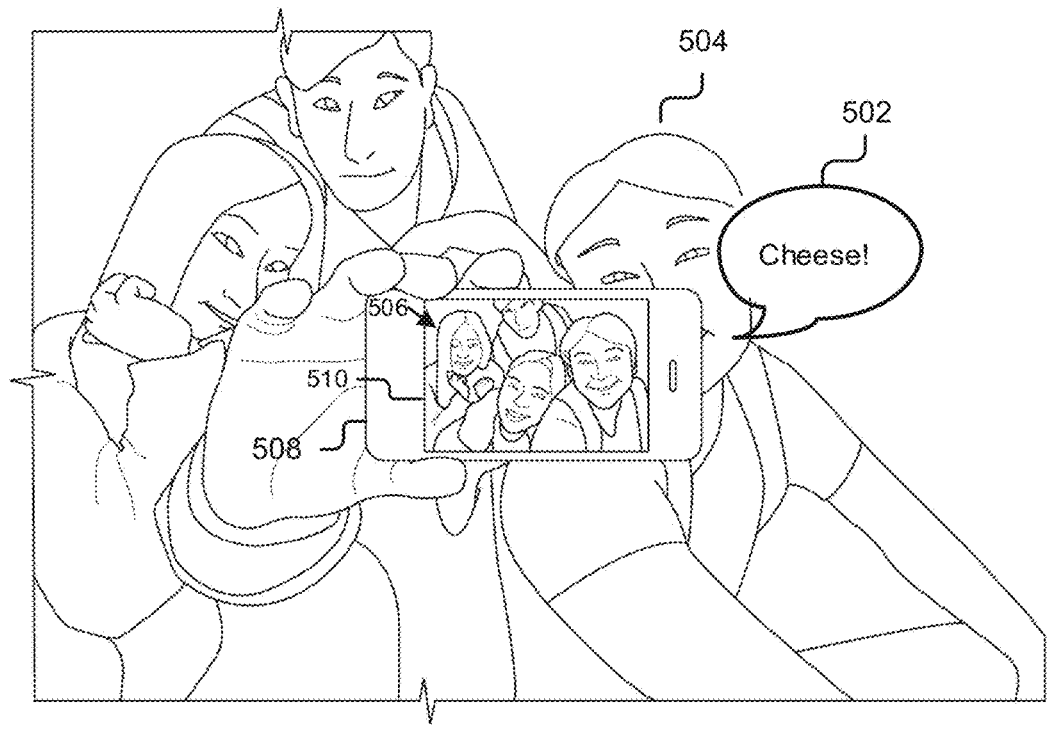
FIGS. 5A and 5B illustrate an example of an image capture upon receiving a voice command from a user.
Figure 5B:
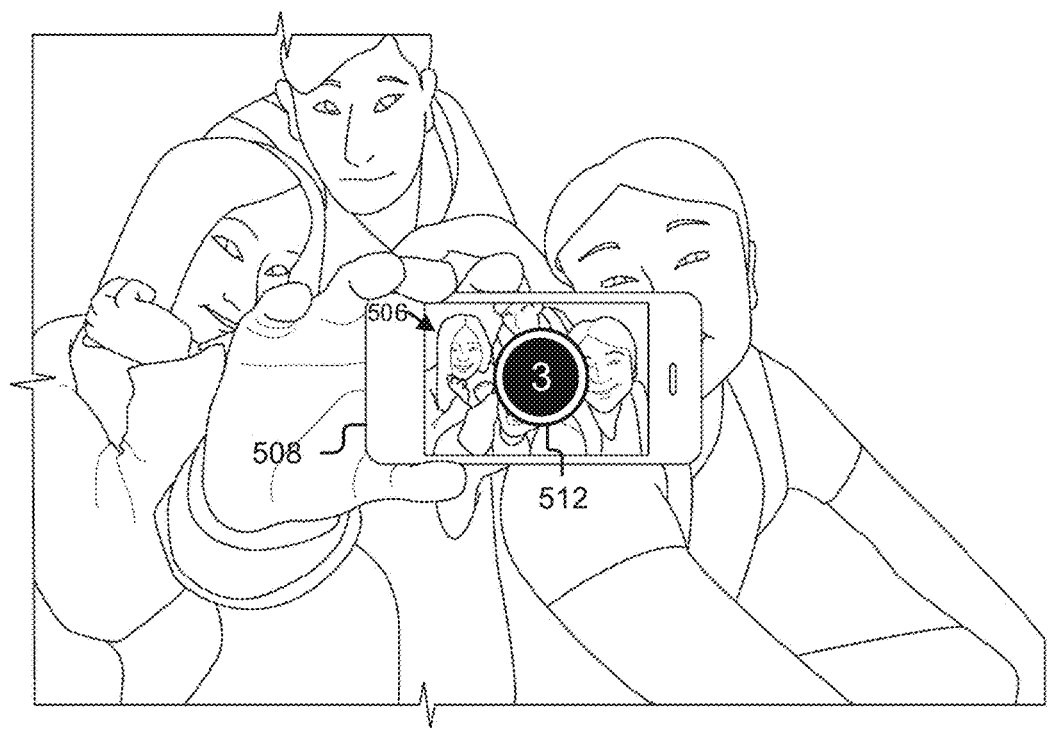

FIG. 5A illustrates an example of a voice command 502 that may be given by a user 504 for image capture. As depicted, a group of friends are trying to capture a group selfie 506 using the back camera of a mobile device 508. Once the camera application (e.g., the client application 732) determines one or more image-capturing criteria as being satisfied (as discussed above), the camera application may play an audible chime or message to alert the users. Upon hearing the audible chime or message, the users may know that they are within the camera frame 510 and the device 508 is stable for image capture. The users can work on their pose or face expressions and once they are ready, one of the users (e.g., user 504) may give a voice command such as "cheese" 502 to the camera application. Upon receiving the voice command, the camera application may initiate a predefined timer 512 for image capture as shown in FIG. 5B. As shown in FIG. 5B, the timer 512 may be a three second timer that signals the back camera of the device 508 to capture the group selfie 506 of the users once it reaches zero.

In particular embodiments, after client application 732 has captured an image (e.g., a group selfie), the client application 732 may display a preview of the captured image along with some options of whether the user wants to post the captured image on his social network (e.g., Facebook) or retake the selfie. By way of an example and in reference to FIG. 4A, Natasha uses her mobile device 400 to capture a group selfie 402 with her friends. The client application 732 may automatically capture the group selfie 402 for Natasha using the process discussed above (in reference to at least FIGS. 4A-4C). Once the selfie 402 is captured, the client application 732 may present the captured group selfie 402 on the display screen of Natasha's mobile device 400 along with two options of whether she wants to post this image on her social network or retake the image. If Natasha's selection is to post the image on the social network, the client application 732 may post the captured image in a newsfeed of the online social network so that other users (e.g., friends) on the social network may be able to see the image and enter any comments about the image. Prior to the client application 732 posting the image, Natasha may be able to set privacy or sharing settings on the image. For instance, Natasha may choose whether she wants the captured image (e.g., the group selfie 402) to be accessible to everyone (e.g., public), to friends, with a specific group, or just to herself in her personal timeline. In case Natasha does not like the captured image (or group selfie 402), she can choose to retake it. In this scenario, the client application 732 may again determine if at least the two image-capturing criteria (as discussed above in reference to FIGS. 4A and 4B) are satisfied and responsive to determining these criteria as satisfied, the client application 732 may retake the image and again present a preview of the captured image along with the same options to Natasha.

Figure 6:
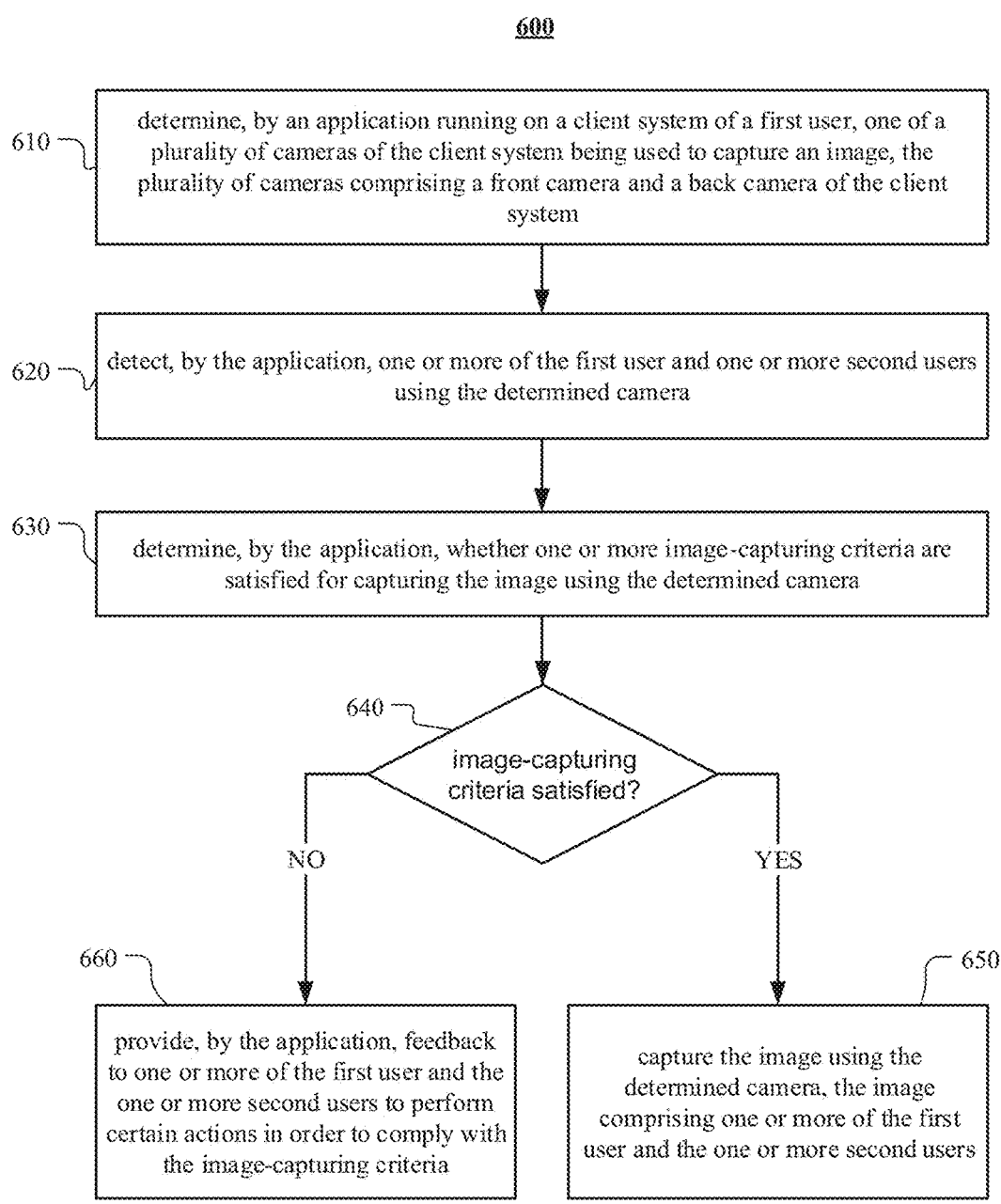
FIG. 6 illustrates an example method for automatically capturing an image (e.g., a group selfie) using a back camera of a client system.

FIG. 6 illustrates an example method 600 for automatically capturing an image (e.g., a group selfie) using a back camera of a client system 730. The method may begin at step 610, where an application (e.g., the client application 732), running on a client system 730 of a first user, may determine one of a plurality of cameras of the client system being used to capture an image. The plurality of cameras may comprise a front camera and a back camera of the client system. At step 620, the application may detect one or more of the first user and one or more second users using the determined camera. At step 630, the application may determine one or more image-capturing criteria for automatically capturing the image using the determined camera. The one or more image-capturing criteria may include, as an example and not by way of limitation, (1) the one or more of the first user and the one or more second users satisfying a threshold visibility within a predefined camera frame (as discussed in reference to FIG. 4A) and (2) the client system 730 being in a stable position (as discussed in reference to FIG. 4B). At step 640, a determination is made as to whether the one or more image-capturing criteria are satisfied. At step 650, if the result of the determination in step 640 is affirmative, the application may capture the image using the determined camera (using the process discussed in reference to FIG. 4C). The image may comprise one or more of the first user and the one or more second users. For example, the image may be a group selfie of a group of friends (as shown in FIG. 4B). At step 660, if the result of the determination in step 640 is negative, the application may provide feedback to one or more of the first user and the one or more second users to perform certain actions in order to comply with the image-capturing criteria. The feedback may be audio feedback personalized according to a user to which the feedback is targeted (as discussed in reference to FIG. 4A).

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for automatically capturing an image using a back camera of a client system including the particular steps of the method of FIG. 6, this disclosure contemplates any suitable method for automatically capturing an image using a back camera of a client system including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
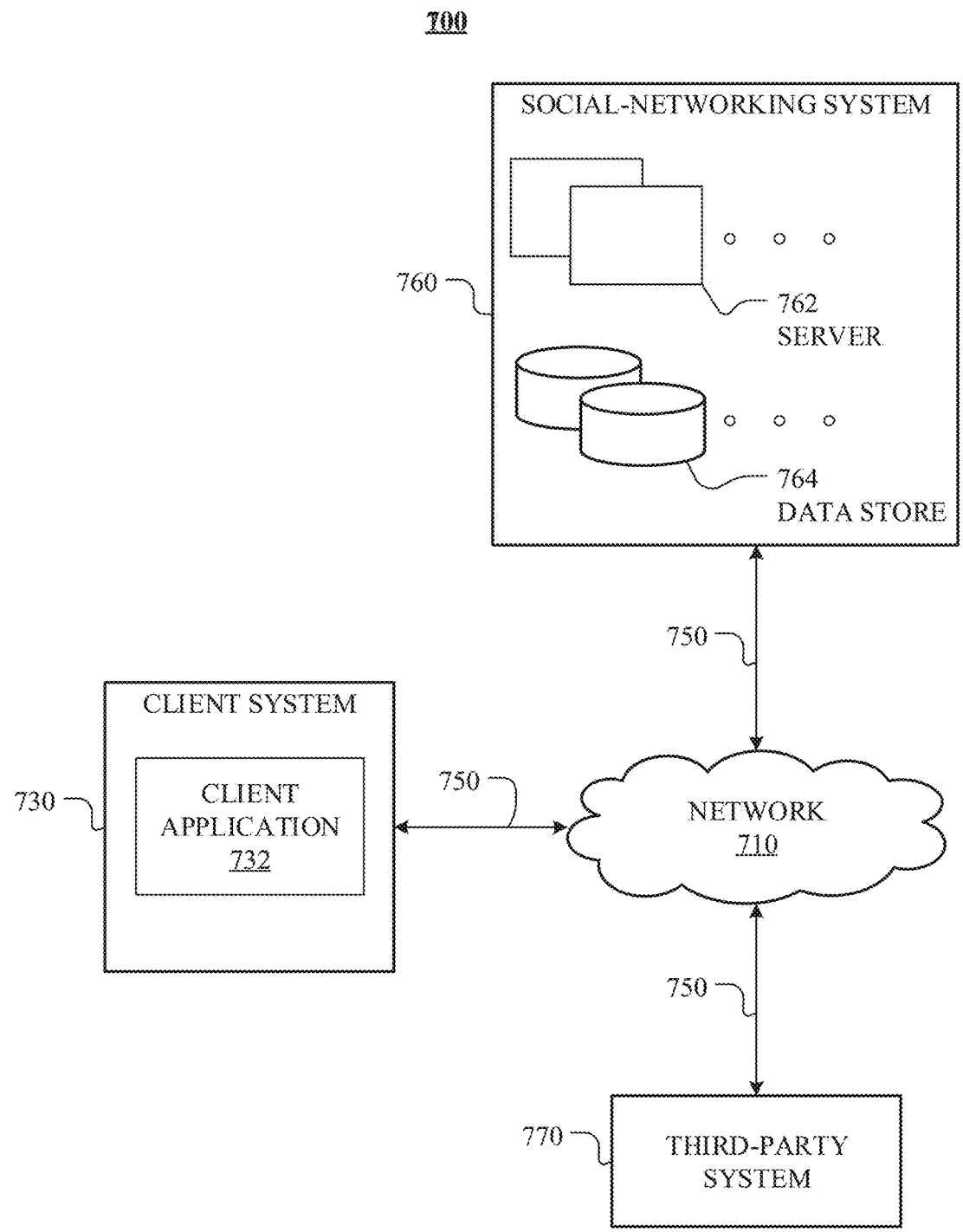
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of a client system 730, a social-networking system 760, a third-party system 770, and a network 710, this disclosure contemplates any suitable arrangement of a client system 730, a social-networking system 760, a third-party system 770, and a network 710. As an example and not by way of limitation, two or more of a client system 730, a social-networking system 760, and a third-party system 770 may be connected to each other directly, bypassing a network 710. As another example, two or more of a client system 730, a social-networking system 760, and a third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client systems 730, social-networking systems 760, third-party systems 770, and networks 710.

This disclosure contemplates any suitable network 710. As an example and not by way of limitation, one or more portions of a network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 710 may include one or more networks 710.

Links 750 may connect a client system 730, a social-networking system 760, and a third-party system 770 to a communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout a network environment 700. One or more first links 750 may differ in one or more respects from one or more second links 750.

In particular embodiments, a client system 730 may be an electronic device including hardware, software, or embedded logic components or a combination of two or more such components and capable of carrying out the appropriate functionalities implemented or supported by a client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 730. A client system 730 may enable a network user at a client system 730 to access a network 710. A client system 730 may enable its user to communicate with other users at other client systems 730.

In particular embodiments, a client system 730 may include a client application 732, which may be a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 730 may enter a Uniform Resource Locator (URL) or other address directing a web browser to a particular server (such as a social network server 762 or a server associated with a third-party system 770), and the web browser may generate a Hyper Text Transfer Protocol (HTTP) request and communicate the HTTP request to server. The server may accept the HTTP request and communicate to a client system 730 one or more Hyper Text Markup Language (HTML) files responsive to the HTTP request. The client system 730 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the client application 732 may be an application operable to provide various computing functionalities, services, and/or resources, and to send data to and receive data from the other entities of the network 710, such as the social-networking system 760 and/or the third-party system 770. As an example and not by way of limitation, the client application 732 may be a camera application associated with an online social network for capturing images/videos of users using cameras (e.g., front camera, back camera) associated with a client system 730. The client application 732 may be configured to automatically capture an image (e.g., a selfie or a group selfie) using a front/back camera of a client system 730 and post the captured image (upon user's approval) on the online social network.

In particular embodiments, the client application 732 may be storable in a memory and executable by a processor of the client system 730 to render user interfaces, receive user input, send data to and receive data from one or more of the social-networking system 760 and the third-party system 770. The client application 732 may generate and present user interfaces to a user via a display of the client system 730. For example, the client application 732 may generate and present user interfaces, as depicted in at least FIGS. 1A, 1B, 2, 4A-4C, 5A, and 5B.

In particular embodiments, the social-networking system 760 may be a network-addressable computing system that can host an online social network. The social-networking system 760 may generate, store, receive, and send social-networking data, such as, for example, user-profile data, concept-profile data, social-graph information, or other suitable data related to the online social network. The social-networking system 760 may be accessed by the other components of network environment 700 either directly or via a network 710. As an example and not by way of limitation, a client system 730 may access the social-networking system 760 using a client application 732, which may be a native application associated with the social-networking system 760 (e.g., a mobile social-networking application, a messaging application, another suitable application, or any combination thereof) either directly or via a network 710. In particular embodiments, the social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, the social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, the social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. The social-networking system 760 may provide users of the online social network the ability to communicate and interact with other users. In particular embodiments, users may join the online social network via the social-networking system 760 and then add connections (e.g., relationships) to a number of other users of the social-networking system 760 whom they want to be connected to. Herein, the term "friend" may refer to any other user of the social-networking system 760 with whom a user has formed a connection, association, or relationship via the social-networking system 760.

In particular embodiments, the social-networking system 760 may provide users with the ability to take actions on various types of items or objects, supported by the social-networking system 760. As an example and not by way of limitation, the items and objects may include groups or social networks to which users of the social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 760 or by an external system of a third-party system 770, which is separate from the social-networking system 760 and coupled to the social-networking system 760 via a network 710.

In particular embodiments, the social-networking system 760 may be capable of linking a variety of entities. As an example and not by way of limitation, the social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating the social-networking system 760. In particular embodiments, however, the social-networking system 760 and third-party systems 770 may operate in conjunction with each other to provide social-networking services to users of the social-networking system 760 or third-party systems 770. In this sense, the social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 760 also includes user-generated content objects, which may enhance a user's interactions with the social-networking system 760. User-generated content may include anything a user can add, upload, send, or "post" to the social-networking system 760. As an example and not by way of limitation, a user communicates posts to the social-networking system 760 from a client system 730. Posts may include data such as status updates or other textual data, location information, photos, videos, links, music or other similar data or media. Content may also be added to the social-networking system 760 by a third-party through a "communication channel," such as a newsfeed or stream.

In particular embodiments, the social-networking system 760 may include a variety of servers, sub-systems, programs, modules, logs, and data stores. In particular embodiments, the social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 760 may also include suitable components such as network interfaces, security mechanisms, load balancers, failover servers, management-and-network-operations consoles, other suitable components, or any suitable combination thereof. In particular embodiments, the social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 760 to one or more client systems 730 or one or more third-party systems 770 via a network 710. The web server may include a mail server or other messaging functionality for receiving and routing messages between the social-networking system 760 and one or more client systems 730. An API-request server may allow a third-party system 770 to access information from the social-networking system 760 by calling one or more APIs. An action logger may be used to receive communications from a web server about a user's actions on or off the social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from a client system 730 responsive to a request received from a client system 730. Authorization servers may be used to enforce one or more privacy settings of the users of the social-networking system 760. A privacy setting of a user determines how particular information associated with a user can be shared. The authorization server may allow users to opt in to or opt out of having their actions logged by the social-networking system 760 or shared with other systems (e.g., a third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
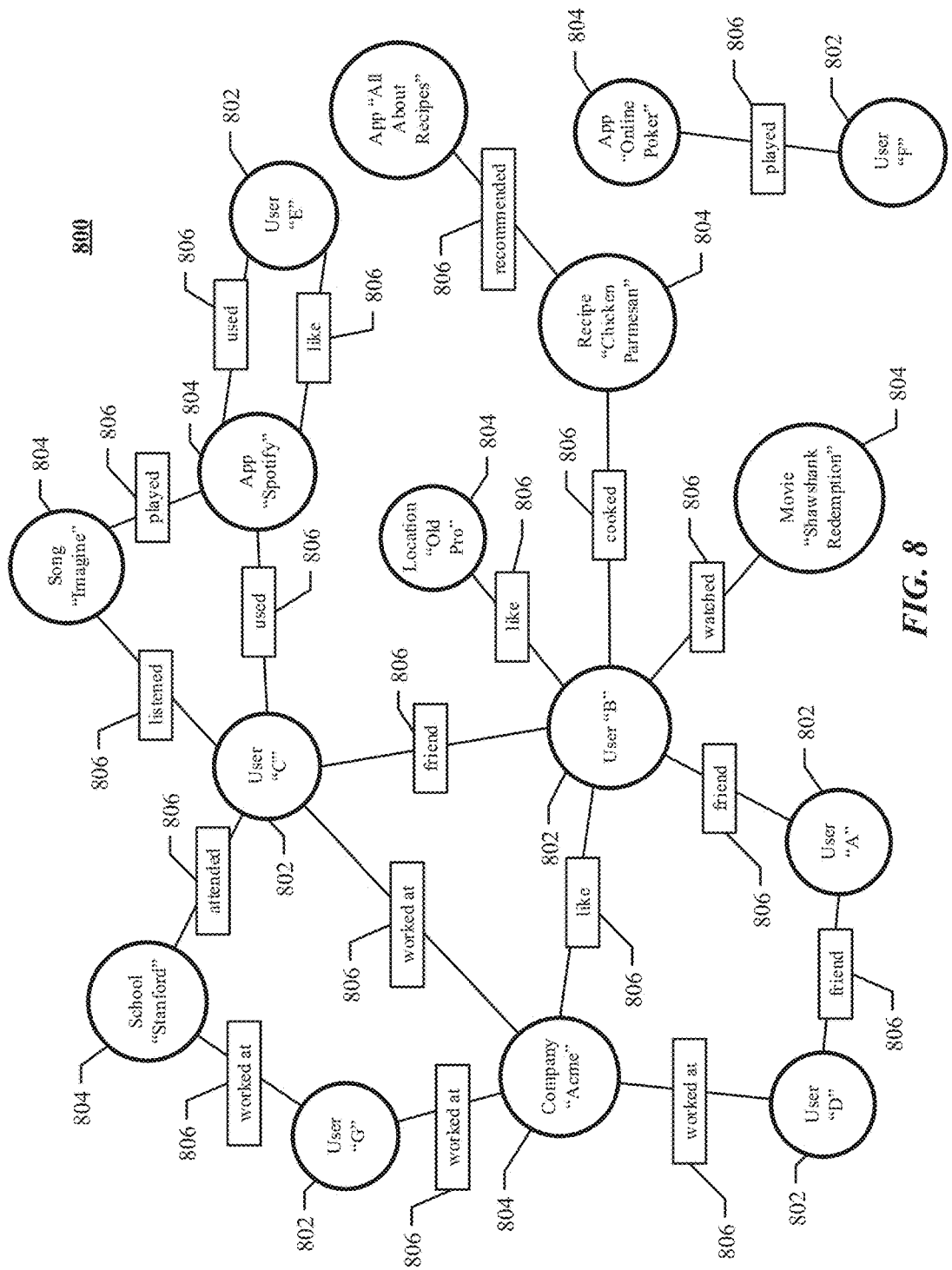
FIG. 8 illustrates an example social graph.

FIG. 8 illustrates an example social graph 800. In particular embodiments, the social-networking system 760 may store one or more social graphs 800 in one or more data stores. In particular embodiments, the social graph 800 may include multiple nodes—which may include multiple user nodes 802 or multiple concept nodes 804—and multiple edges 806 connecting the nodes. The example social graph 800 illustrated in FIG. 8 is shown, for didactic purposes, in a two-dimensional visual map representation. In particular embodiments, a social-networking system 760, a client system 730, or a third-party system 770 may access the social graph 800 and related social-graph information for suitable applications. The nodes and edges of the social graph 800 may be stored as data objects, for example, in a data store (such as a social-graph database). Such a data store may include one or more searchable or queryable indexes of nodes or edges of the social graph 800.

In particular embodiments, a user node 802 may correspond to a user of the social-networking system 760. As an example and not by way of limitation, a user may be an individual (human user), an entity (e.g., an enterprise, business, or third-party application), or a group (e.g., of individuals or entities) that interacts or communicates with or over the social-networking system 760. In particular embodiments, when a user registers for an account with the social-networking system 760, the social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with the social-networking system 760. In particular embodiments, a user node 802 may be associated with information provided by a user or information gathered by various systems, including the social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more web interfaces.

In particular embodiments, a concept node 804 may correspond to a concept. As an example and not by way of limitation, a concept may correspond to a place (such as, for example, a movie theater, restaurant, landmark, or city); a website (such as, for example, a website associated with the social-networking system 760 or a third-party website associated with a web-application server); an entity (such as, for example, a person, business, group, sports team, or celebrity); a resource (such as, for example, an audio file, video file, digital photo, text file, structured document, or application) which may be located within the social-networking system 760 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including the social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more web interfaces.

In particular embodiments, a node in the social graph 800 may represent or be represented by a web interface (which may be referred to as a "profile interface"). Profile interfaces may be hosted by or accessible to the social-networking system 760. Profile interfaces may also be hosted on third-party websites associated with a third-party system 770. As an example and not by way of limitation, a profile interface corresponding to a particular external web interface may be the particular external web interface and the profile interface may correspond to a particular concept node 804. Profile interfaces may be viewable by all or a selected subset of other users. As an example and not by way of limitation, a user node 802 may have a corresponding user-profile interface in which the corresponding user may add content, make declarations, or otherwise express himself or herself. As another example and not by way of limitation, a concept node 804 may have a corresponding concept-profile interface in which one or more users may add content, make declarations, or express themselves, particularly in relation to the concept corresponding to concept node 804.

In particular embodiments, a concept node 804 may represent a third-party web interface or resource hosted by a third-party system 770. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 730 to send to the social-networking system 760 a message indicating the user's action. In response to the message, the social-networking system 760 may create an edge (e.g., a check-in-type edge) between a user node 802 corresponding to the user and a concept node 804 corresponding to the third-party web interface or resource and store edge 806 in one or more data stores.

In particular embodiments, a pair of nodes in the social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, the social-networking system 760 may send a "friend request" to the second user. If the second user confirms the "friend request," the social-networking system 760 may create an edge 806 connecting the first user's user node 802 to the second user's user node 802 in the social graph 800 and store edge 806 as social-graph information in one or more of data stores 764. In the example of FIG. 8, the social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile interface corresponding to a concept node 804 may include, for example, a selectable "check in" icon (such as, for example, a clickable "check in" icon) or a selectable "add to favorites" icon. Similarly, after a user clicks these icons, the social-networking system 760 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, the social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, the social-networking system 760 may create an edge 806 between a user node 802 and a concept node 804 in the social graph 800. As an example and not by way of limitation, a user viewing a concept-profile interface (such as, for example, by using a web browser or a special-purpose application hosted by the user's client system 730) may indicate that he or she likes the concept represented by the concept node 804 by clicking or selecting a "Like" icon, which may cause the user's client system 730 to send to the social-networking system 760 a message indicating the user's liking of the concept associated with the concept-profile interface. In response to the message, the social-networking system 760 may create an edge 806 between user node 802 associated with the user and concept node 804, as illustrated by "like" edge 806 between the user and concept node 804. In particular embodiments, the social-networking system 760 may store an edge 806 in one or more data stores. In particular embodiments, an edge 806 may be automatically formed by the social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, the social-networking system 760 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 770 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 760 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 760 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 760 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 760 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 760 may calculate a coefficient based on a user's actions. The social-networking system 760 may monitor such actions on the online social network, on a third-party system 770, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 760 may calculate a coefficient based on the user's actions with particular types of content. The content may be associated with the online social network, a third-party system 770, or another suitable system. The content may include users, profile interfaces, posts, news stories, headlines, instant messages, chat room conversations, emails, advertisements, pictures, video, music, other suitable objects, or any combination thereof. The social-networking system 760 may analyze a user's actions to determine whether one or more of the actions indicate an affinity for subject matter, content, other users, and so forth. As an example and not by way of limitation, if a user frequently posts content related to "coffee" or variants thereof, the social-networking system 760 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 760 may calculate a coefficient based on the type of relationship between particular objects. Referencing the social graph 800, the social-networking system 760 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 760 may determine that the user has a higher coefficient with respect to the first photo than the second photo because having a tagged-in-type relationship with content may be assigned a higher weight and/or rating than having a like-type relationship with content. In particular embodiments, the social-networking system 760 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 760 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, the social-networking system 760 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 730 of the user). A first user may be more interested in other users or concepts that are closer to the first user. As an example and not by way of limitation, if a user is one mile from an airport and two miles from a gas station, the social-networking system 760 may determine that the user has a higher coefficient for the airport than the gas station based on the proximity of the airport to the user.

In particular embodiments, the social-networking system 760 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 760 may provide information that is relevant to user's interests and current circumstances, increasing the likelihood that they will find such information of interest. In particular embodiments, the social-networking system 760 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 760 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 760 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 770 (e.g., via an API or other communication channel), or from another suitable system. In response to the request, the social-networking system 760 may calculate the coefficient (or access the coefficient information if it has previously been calculated and stored). In particular embodiments, the social-networking system 760 may measure an affinity with respect to a particular process. Different processes (both internal and external to the online social network) may request a coefficient for a particular object or set of objects. The social-networking system 760 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by the social-networking system 760 or shared with other systems (e.g., a third-party system 770). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 770, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 762 may be authorization/privacy servers for enforcing privacy settings. In response to a request from a user (or other entity) for a particular object stored in a data store 764, the social-networking system 760 may send a request to the data store 764 for the object. The request may identify the user associated with the request and may only be sent to the user (or a client system 730 of the user) if the authorization server determines that the user is authorized to access the object based on the privacy settings associated with the object. If the requesting user is not authorized to access the object, the authorization server may prevent the requested object from being retrieved from the data store 764, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 9:
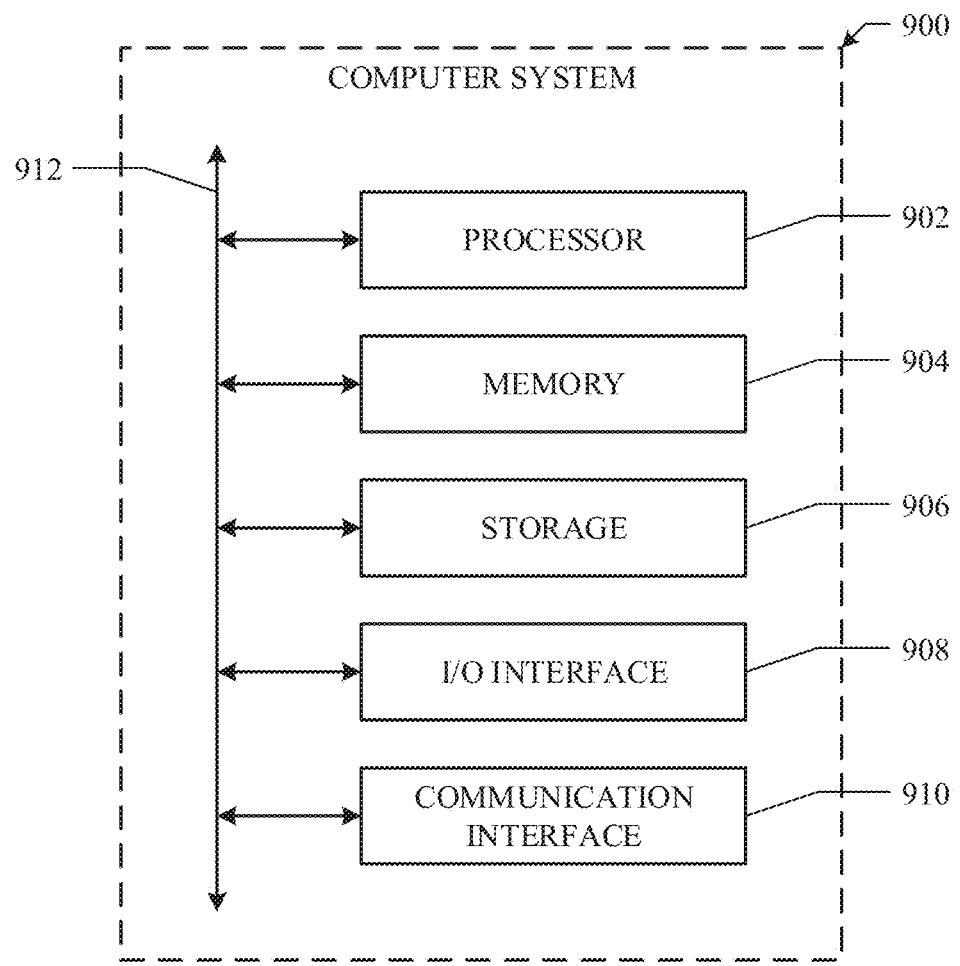
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
    determining, by an application running on a client system of a first user, one of a plurality of cameras of the client system being used to capture an image, the plurality of cameras comprising a front camera and a back camera of the client system;
    detecting, by the application, one or more of the first user and one or more second users using the determined camera;
    determining, by the application, whether one or more image-capturing criteria are satisfied for capturing the image using the determined camera; and
    if the one or more image-capturing criteria are satisfied, capturing the image using the determined camera, the image comprising one or more of the first user and the one or more second users,
    else, providing, by the application, feedback to one or more of the first user and the one or more second users to perform one or more actions in order to comply with the image-capturing criteria.

2. The method of claim 1, further comprising:
    accessing, by the application, social-networking information associated with one or more of the first user and the one or more second users,
    wherein the application uses the social-networking information to provide the feedback to the one or more of the first user and the one or more second users.

3. The method of claim 2, wherein the feedback is a personalized audio feedback.

4. The method of claim 1, wherein prior to capturing the image:
    providing, by the application, an audible chime when the one or more image-capturing criteria are satisfied, the audible chime alerting the one or more of the first user and the one or more second users to prepare for the image; and
    receiving a voice command from one or more of the first user and the one or more second users instructing the application to capture the image,
    wherein the image is captured in response to receiving the voice command.

5. The method of claim 1, wherein the one or more image-capturing criteria comprise:
    the one or more of the first user and the one or more second users satisfying a threshold visibility within a predefined camera frame; or
    the client system being in a stable position.

6. The method of claim 5, further comprising:
    determining that one or more of the first user and the one or more second users are at least partially outside the predefined camera frame, wherein the feedback is audio feedback indicating directions to a user who is at least partially outside the predefined camera frame to align the user within the camera frame.

7. The method of claim 1, further comprising:
    providing, by the application, an audible chime when the one or more image-capturing criteria are satisfied, the audible chime alerting the first user and the one or more second users to prepare for the image; and
    starting, by the application once the audible chime is provided, a pre-defined timer to capture the image.

8. The method of claim 1, further comprising:
    after detecting one or more of the first user and the one or more second users, analyzing, by the application, a scene surrounding the one or more of the first user and the one or more second users, wherein an image-capturing criterion comprises the scene meeting one or more conditions before the image is captured.

9. The method of claim 8, wherein the one or more conditions comprise one or more of a threshold degree of lighting and less than a maximum amount of shadows.

10. The method of claim 9, further comprising:
    determining that the scene has not met the one or more conditions, wherein the feedback is audio feedback indicating instructions to the one or more of the first user and the one or more second users to perform certain actions so that the scene satisfies the one or more conditions.

11. The method of claim 1, wherein the image is captured without receiving an input from the first user or the one or more second users.

12. The method of claim 1, wherein the application is a camera application associated with an online social network.

13. The method of claim 1, wherein the determined camera is the back camera.

14. The method of claim 1, wherein the image is a group picture comprising the first user and the one or more second users.

15. One or more computer-readable non-transitory storage media embodying software that is operable when executed to:
    determine, by an application running on a client system of a first user, one of a plurality of cameras of the client system being used to capture an image, the plurality of cameras comprising a front camera and a back camera of the client system;
    detect, by the application, one or more of the first user and one or more second users using the determined camera;
    determine, by the application, whether one or more image-capturing criteria are satisfied for capturing the image using the determined camera; and
    if the one or more image-capturing criteria are satisfied, capture the image using the determined camera, the image comprising one or more of the first user and the one or more second users, else, provide, by the application, feedback to one or more of the first user and the one or more second users to perform one or more actions in order to comply with the image-capturing criteria.

16. The media of claim 15, wherein the software is further operable when executed to:
   access, by the application, social-networking information associated with one or more of the first user and the one or more second users,
   wherein the application uses the social-networking information to provide the feedback to the one or more of the first user and the one or more second users.

17. The media of claim 15, wherein the software is further operable when executed to:
   provide, by the application, an audible chime when the one or more image-capturing criteria are satisfied, the audible chime alerting the one or more of the first user and the one or more second users to prepare for the image; and
   receive a voice command from one or more of the first user and the one or more second users instructing the application to capture the image,
   wherein the image is captured in response to receiving the voice command.

18. A system comprising: one or more processors; and a non-transitory memory coupled to the processors comprising instructions executable by the processors, the processors operable when executing the instructions to:
   determine, by an application running on a client system of a first user, one of a plurality of cameras of the client system being used to capture an image, the plurality of cameras comprising a front camera and a back camera of the client system;
   detect, by the application, one or more of the first user and one or more second users using the determined camera;
   determine, by the application, whether one or more image-capturing criteria are satisfied for capturing the image using the determined camera; and
   if the one or more image-capturing criteria are satisfied, capture the image using the determined camera, the image comprising one or more of the first user and the one or more second users,
   else, provide, by the application, feedback to one or more of the first user and the one or more second users to perform one or more actions in order to comply with the image-capturing criteria.

19. The system of claim 18, wherein the processors are further operable when executing the instructions to:
   access, by the application, social-networking information associated with one or more of the first user and the one or more second users,
   wherein the application uses the social-networking information to provide the feedback to the one or more of the first user and the one or more second users.

20. The system of claim 18, wherein the processors are further operable when executing the instructions to:
   provide, by the application, an audible chime when the one or more image-capturing criteria are satisfied, the audible chime alerting the one or more of the first user and the one or more second users to prepare for the image; and
   receive a voice command from one or more of the first user and the one or more second users instructing the application to capture the image,
   wherein the image is captured in response to receiving the voice command.

* * * * *